United States Patent
Whittington et al.

(10) Patent No.: US 8,090,348 B2
(45) Date of Patent: *Jan. 3, 2012

(54) SYSTEM AND METHOD FOR ASSIGNING A PERSONALIZED INDICIUM TO A MOBILE COMMUNICATIONS DEVICE

(75) Inventors: Graeme Whittington, Waterloo (CA); Allan David Lewis, New Dundee (CA); James Godfrey, Mississauga (CA); Christopher Smith, Burlington (CA); Arun Munje, Kanata (CA); Thomas Leonard Trevor Plesid, Ottawa (CA); David R. Clark, Kitchener (CA); Michal A. Rybak, St. James (BB); Robbie John Maurice, Waterloo (CA); Marc Plumb, Kitchener (CA)

(73) Assignee: Research In Motion Limited, Waterloo (CA)

( * ) Notice: Subject to any disclaimer, the term of this patent is extended or adjusted under 35 U.S.C. 154(b) by 977 days.

This patent is subject to a terminal disclaimer.

(21) Appl. No.: 12/029,870

(22) Filed: Feb. 12, 2008

(65) Prior Publication Data

US 2008/0132203 A1 Jun. 5, 2008

Related U.S. Application Data

(63) Continuation of application No. 10/997,577, filed on Nov. 24, 2004, now Pat. No. 7,356,330.

(51) Int. Cl.
*H04M 1/66* (2006.01)
(52) U.S. Cl. ............ 455/410; 455/411; 455/435.1; 455/419; 455/446; 455/422.1
(58) Field of Classification Search .......... 455/410–411, 455/435.1, 422.1, 419, 446
See application file for complete search history.

(56) References Cited

U.S. PATENT DOCUMENTS

| | | | |
|---|---|---|---|
| 5,952,934 A | 9/1999 | Matsumoto et al. | |
| 6,064,879 A | 5/2000 | Fujiwara et al. | |
| 6,393,298 B1 | 5/2002 | Fulton | |
| 6,697,625 B1 | 2/2004 | Rune | |
| 7,155,222 B1 * | 12/2006 | Jain et al. | 455/435.1 |
| 2006/0116122 A1 * | 6/2006 | Verma et al. | 455/435.1 |

FOREIGN PATENT DOCUMENTS

| | | |
|---|---|---|
| EP | 0 778 716 A2 | 6/1997 |
| EP | 1 150 531 A2 | 10/2001 |

(Continued)

OTHER PUBLICATIONS

Canadian Office Action; Application No. 2,527,500; Canadian Intellectual Property Office; Mar. 10, 2010; 2 pgs.

(Continued)

*Primary Examiner* — Charles Appiah
*Assistant Examiner* — Michael Vu
(74) *Attorney, Agent, or Firm* — The Danamraj Law Group, P.C.

(57) ABSTRACT

In one embodiment, a scheme is provided for assigning a personalized indicium to a mobile communications device which includes logic means operable to generate a temporary Personal Information Number (PIN) for transmitting in a request to a network node. Upon validating the request, a response is provided by the network node to the mobile communications device, the response including a permanent PIN assigned to the mobile communications device.

28 Claims, 8 Drawing Sheets

FOREIGN PATENT DOCUMENTS

| | | |
|---|---|---|
| EP | 1 195 973 A1 | 4/2002 |
| EP | 1662829 | 5/2006 |
| EP | 1809062 | 7/2007 |

OTHER PUBLICATIONS

European Search Report Application No. 04257293.3; European Patent Office; Apr. 28, 2005; 7 pages.

Communication Pursuant to Article 96(2) Application No. 04257293.3; European Patent Office; Oct. 12, 2005; 4 pages.

European Search Report Application No. 04257293.3; European Patent Office; Jan. 23, 2007; 7 pages.

EPO, Extended European Search Report, Application No. 06126560.9, Feb. 12, 2007, 8 pgs.

EPO, Communication Pursuant to Article 94(3) EPC, Application No. 06126560.9, Jun. 2, 2008, 1 pg.

EPO, Communication Under Rule 71(3) EPC, Application No. 06126560.9, Nov. 21, 2008, 6 pgs.

EPO, Decision to Grant a European Patent Pursuant to Article 97(1) EPC, Application No. 06126560.9, Apr. 23, 2009, 1 pg.

Hong Kong IPD, Certificate of Grant of Patent (HK1091359), Application No. 06112954.3, Aug. 10, 2007, 1 pg.

Hong Kong IPD, Certificate of Grant of Patent (HK1108793), Application No. 08100706.7, Aug. 7, 2009, 1 pg.

USPTO, Office Action, U.S. Appl. No. 10/997,577, Jun. 19, 2006, 8 pgs.

USPTO, Office Action, U.S. Appl. No. 10/997,577, Nov. 27, 2006, 10 pgs.

CIPO, Notice of Allowance, Application No. 2,527,500, Sep. 28, 2011, 1 pg.

\* cited by examiner

SYSTEM AND METHOD FOR ASSIGNING A PERSONALIZED INDICIUM TO A MOBILE COMMUNICATIONS DEVICE

CLAIM OF PRIORITY UNDER 35 U.S.C. §120 & 37 C.F.R. §1.78

This nonprovisional application is a continuation application claiming the benefit of the following prior United States patent application entitled: SYSTEM AND METHOD FOR ASSIGNING A PERSONALIZED INDICIUM TO A MOBILE COMMUNICATIONS DEVICE, filed Nov. 24, 2004, application Ser. No. 10/997,577, which is hereby incorporated by reference.

CROSS-REFERENCE TO RELATED APPLICATION(S)

This patent application discloses subject matter related to the subject matter disclosed in the following commonly owned co-pending patent applications: (i) "SYSTEM AND METHOD FOR PORTING A PERSONALIZED INDICIUM ASSIGNED TO A MOBILE COMMUNICATIONS DEVICE," filed Nov. 24, 2004, application Ser. No. 10/997,555; (ii) "SYSTEM AND METHOD FOR SECURING A PERSONALIZED INDICIUM ASSIGNED TO A MOBILE COMMUNICATIONS DEVICE," filed Nov. 24, 2004, application Ser. No. 10/996,702; and (iii) "SYSTEM AND METHOD FOR MANAGING SECURE REGISTRATION OF A MOBILE COMMUNICATIONS DEVICE," filed Nov. 24, 2004, application Ser. No. 10/996,925; all of which are incorporated by reference herein.

FIELD OF THE APPLICATION

The present patent application generally relates to wireless packet data service networks. More particularly, and not by way of any limitation, the present patent application is directed to a system and method for assigning a personalized indicium to a mobile communications device operable to be disposed in a wireless packet data service network.

BACKGROUND

It is becoming commonplace to use wireless packet data service networks for effectuating data sessions with mobile communications devices. In some implementations, unique indicia need to be assigned to the devices in order to facilitate certain aspects of service provisioning, e.g., security, validation and authentication, et cetera. In such scenarios, it becomes imperative that no two devices have the same indicium (i.e., collision). Further, provisioning of such indicia should be flexible so as to maintain the entire pool of indicia to a manageable level while allowing for their widespread use in multiple service environments.

SUMMARY

In one embodiment, a scheme is provided for assigning a personalized indicium to a mobile communications device, comprising one or more of the following features: transmitting a request by the mobile communications device to a network node, the request including a temporary Personal Information Number (PIN) and at least one of a device identifier and a subscriber identifier relating to the mobile communications device, wherein the temporary PIN is locally generated within the mobile communications device; and receiving a response from the network node, the response including a permanent PIN assigned to the mobile communications device.

In another embodiment, a mobile communications device is disclosed which comprises one or more of the following: means operable to generate a temporary PIN for transmitting in a request for assignment of a personalized indicium, the request being directed to a network node operable with a wireless network; and means operable to execute a registration procedure with the network node using the personalized indicium upon receipt thereof, the personalized indicium comprising a permanent PIN assigned to the mobile communications device that is received via a response from the network node.

In yet another embodiment, a network node is disclosed for dynamically assigning Personal Information Numbers (PINs) to mobile communications devices, which node comprises one or more of the following features: means for validating a request received from a mobile communications device, the request including a temporary PIN locally generated within the mobile communications device and at least one of a device identifier and a subscriber identifier relating to the mobile communications device; and means for assigning a permanent PIN to the mobile communications device upon validating the request, wherein the permanent PIN is operable to be transmitted to the mobile communications device via a response from the network node.

In a further aspect, another embodiment of a method for managing assignment of a personalized indicium to a mobile communications device is disclosed. The claimed embodiment comprises one or more of the following features: transmitting a request by the mobile communications device to a network node, the request including a temporary Personal Information Number (TPIN) and at least one of a device identifier and a subscriber identifier relating to the mobile communications device; and upon receiving a response from the network node, the response including a permanent PIN (PPIN) assigned to the mobile communications device, executing a registration request using the permanent PIN within a time window, wherein the TPIN is generated within the mobile communications device.

In a still further aspect, an embodiment of a method for dynamically assigning PINs to mobile communications devices is disclosed. The claimed embodiment comprises one or more of the following features: validating a request received from a mobile communications device, the request including a temporary PIN generated within the mobile communications device and at least one of a device identifier and a subscriber identifier relating to the mobile communications device; provisioning a permanent PIN to the mobile communications device upon validating the request; providing the PPIN to the mobile communications device via a response that includes a time window parameter.

In a still further aspect, disclosed herein is another embodiment of a network node adapted for dynamically assigning PINs to mobile communications devices. The claimed embodiment comprised one or more of the following features: means for validating a request received from a mobile communications device, the request including a temporary PIN generated within the mobile communications device and at least one of a device identifier and a subscriber identifier relating to the mobile communications device; means for provisioning a permanent PIN to the mobile communications device upon validating the request; means for providing the PPIN to the mobile communications device via a response that includes a time window parameter.

BRIEF DESCRIPTION OF THE DRAWINGS

A more complete understanding of the embodiments of the present patent application may be had by reference to the following Detailed Description when taken in conjunction with the accompanying drawings wherein.

DETAILED DESCRIPTION OF THE DRAWINGS

Figure 1:
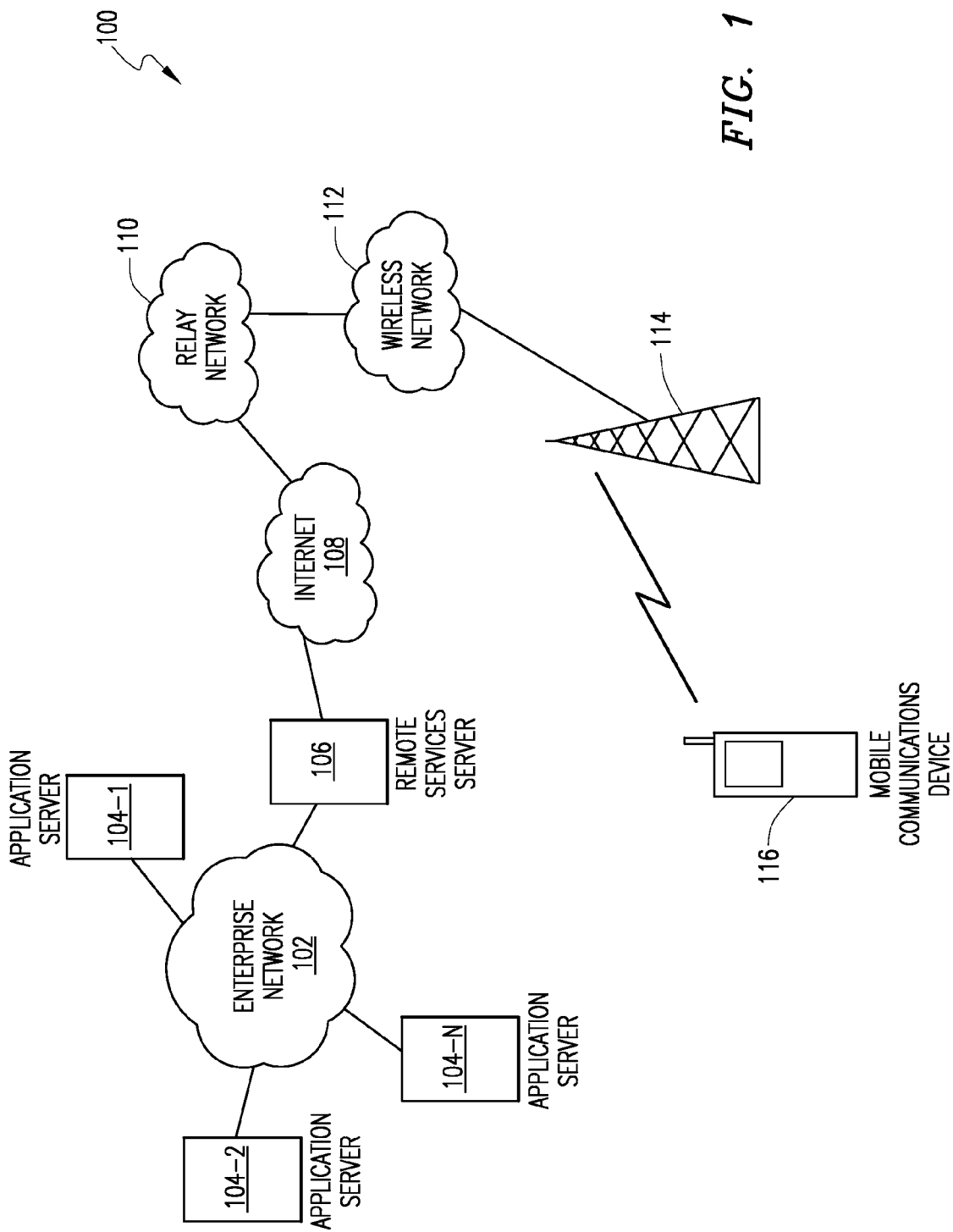
FIG. 1 depicts an exemplary network environment including a wireless packet data service network wherein an embodiment of the present patent application may be practiced.

A system and method of the present patent application will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 including a wireless packet data service network 112 wherein an embodiment of the present patent application may be practiced. An enterprise network 102, which may be a packet-switched network, can t include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, i=1, 2, ..., N, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. In another embodiment, the infrastructure of the trusted relay network 110 may be integrated with the wireless packet data service network 112, whereby the functionality of the relay infrastructure, certain aspects of which will be described in greater detail below, is consolidated as a separate layer within a "one-network" environment. Additionally, by way of example, MCD 116 may be a data-enabled mobile handheld device capable of receiving and sending messages, web browsing, interfacing with corporate application servers, et cetera, regardless of the relationship between the networks 110 and 112. Accordingly, a "network node" may include both relay functionality and wireless network infrastructure functionality in some exemplary implementations.

For purposes of the present patent application, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any $3^{rd}$ Generation (3G) network. As will be seen hereinbelow, the embodiments of the present patent application for assigning and managing a personalized indicium such as a PIN with respect to MCD 116 will be described regardless of any particular wireless network implementation.

Figure 2:
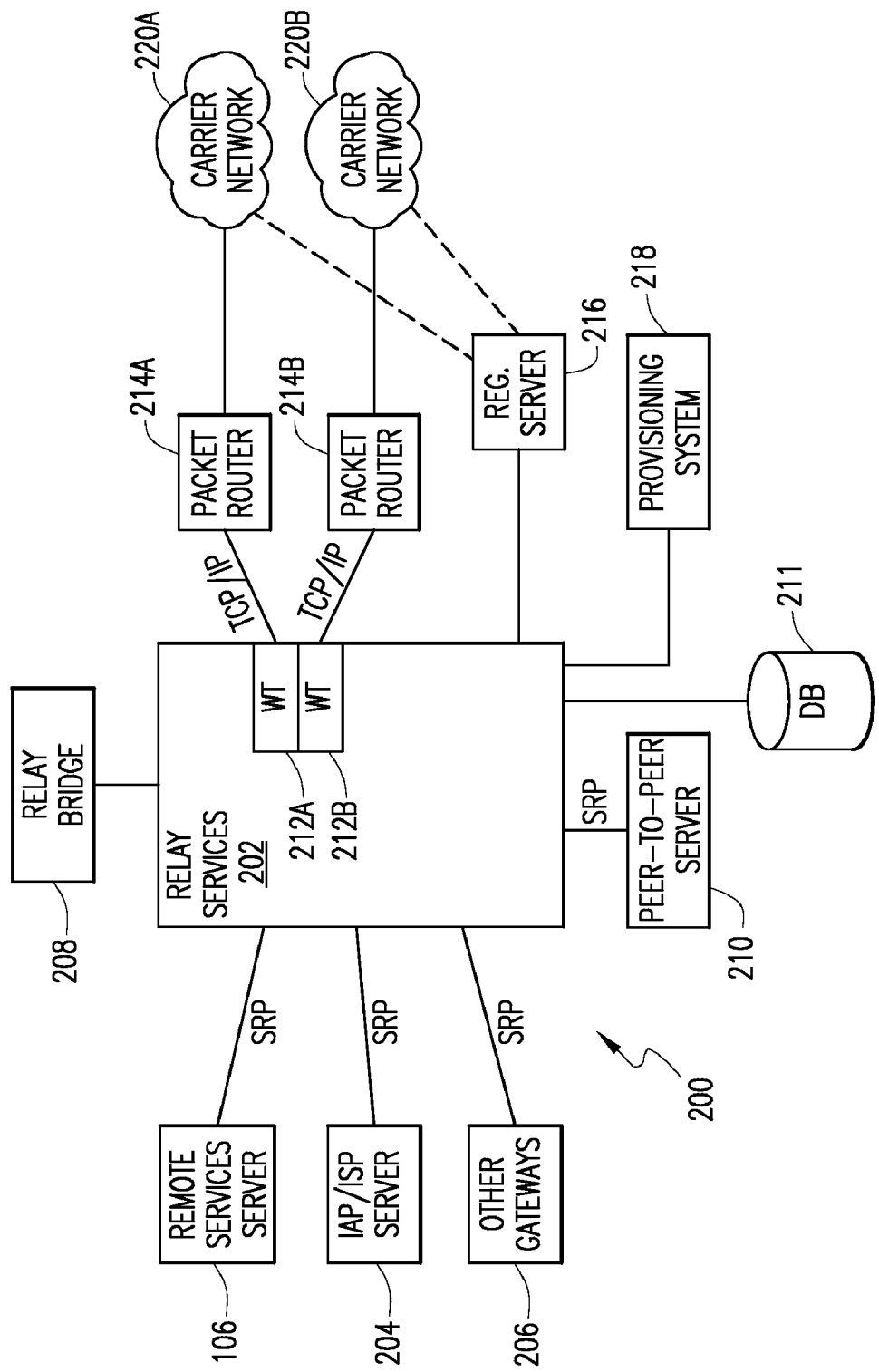
FIG. 2 depicts additional details of an exemplary relay network operable with a mobile communications device in accordance with an embodiment.

FIG. 2 depicts additional details of an exemplary relay network infrastructure 200 operable as part of relay network 110 interfacing with the wireless packet data service network 112 described above. A relay services node 202 is operable, at least in part, for providing connectivity between MCDs and various data application services (enterprise services, external IP data services, et cetera), regardless of the geographic location of the MCDs and their respective wireless carriers. Also, since multiple relay services nodes can co-exist in a distributed network architecture, a relay bridge 208 may be provided in operable connection with the relay services node 202 for supporting inter-relay connectivity. In one implementation, relay bridge 208 connects with separate relay node sites, forming tunnels between relays over which MCD messages can flow to and from services, irrespective of the region where the MCD is in.

Communication between the relay services node 202 and various application gateways and servers is effectuated using any suitable protocol, e.g., Server Relay Protocol (SRP), preferably over IP links. By way of illustration, remote services server 106 associated with the enterprise network 102 (shown in FIG. 1) communicates with the relay using SRP for effectuating internal data services with respect to the enterprise's mobile subscribers. Likewise, reference numerals 204 and 206 refer to external application gateways, such as Internet Service Provider (ISP) or Internet Access Provider (IAP)

servers, and other gateways, respectively, which are also interfaced with the relay node 202 using SRP. A peer-to-peer server 210 may also be provided in operable connection with the relay node 202 for handling peer-level messaging between two MCDs using their respective PIN indicia.

Additionally, a database 211 may be provided in operable connection with the relay node 202 for handling and managing MCD location information. Preferably, this location information is stored by PIN indicia of the MCDs, wherein the records maintain a particular device's last known location. A registration server 216 is operable for providing registration services for MCDs when they are initially activated or when the user re-registers due to moving to a different wireless network coverage area. In one implementation, the location information of registration server 216 may be programmed into an MCD. When the MCD registers successfully, registration server 216 is operable to provide the serving relay node's location, whereupon data sessions may be engaged by the MCD.

One or more wireless transport (WT) interfaces are provided as part of relay services node 202 for connecting with wireless carrier networks that service MCDs. By way of illustration, WT 212A and WT 212B communicate with respective packet routers 214A and 214B using TCP/IP links, which route data packets to and from respective wireless packet data service networks, exemplified in FIG. 2 as carrier network 220A and carrier network 220B. Although not specifically shown, registration server 216, which handles administration and registration services for MCDs, may be provided with separate WT and packet routing for interfacing with the carrier networks 220A, 220B.

A provisioning system (PRV) 218 may be co-located or otherwise associated with the relay services node 202 for setting up and managing various service providers (i.e., carrier networks), subscribers, MCD manufacturers, resellers, and other entities in order to support any number of service and market differentiation requirements. Additionally, the provisioning system 218 may include logic for provisioning personalized indicia (e.g., PIN assignment and management) with respect to the MCDs. Also, subscriber validation logic may be provided as part of the provisioning system 208. Accordingly, the provisioning system 208 may be implemented with a plurality of interfaces with respect to the various modules of the relay services node 202, e.g., interfaces to registration servers, peer-to-peer servers, location databases, et cetera, in addition to including attendant service logic processing that may be realized in suitable hardware, firmware and/or firmware logic blocks as well as database structures.

Figure 3:
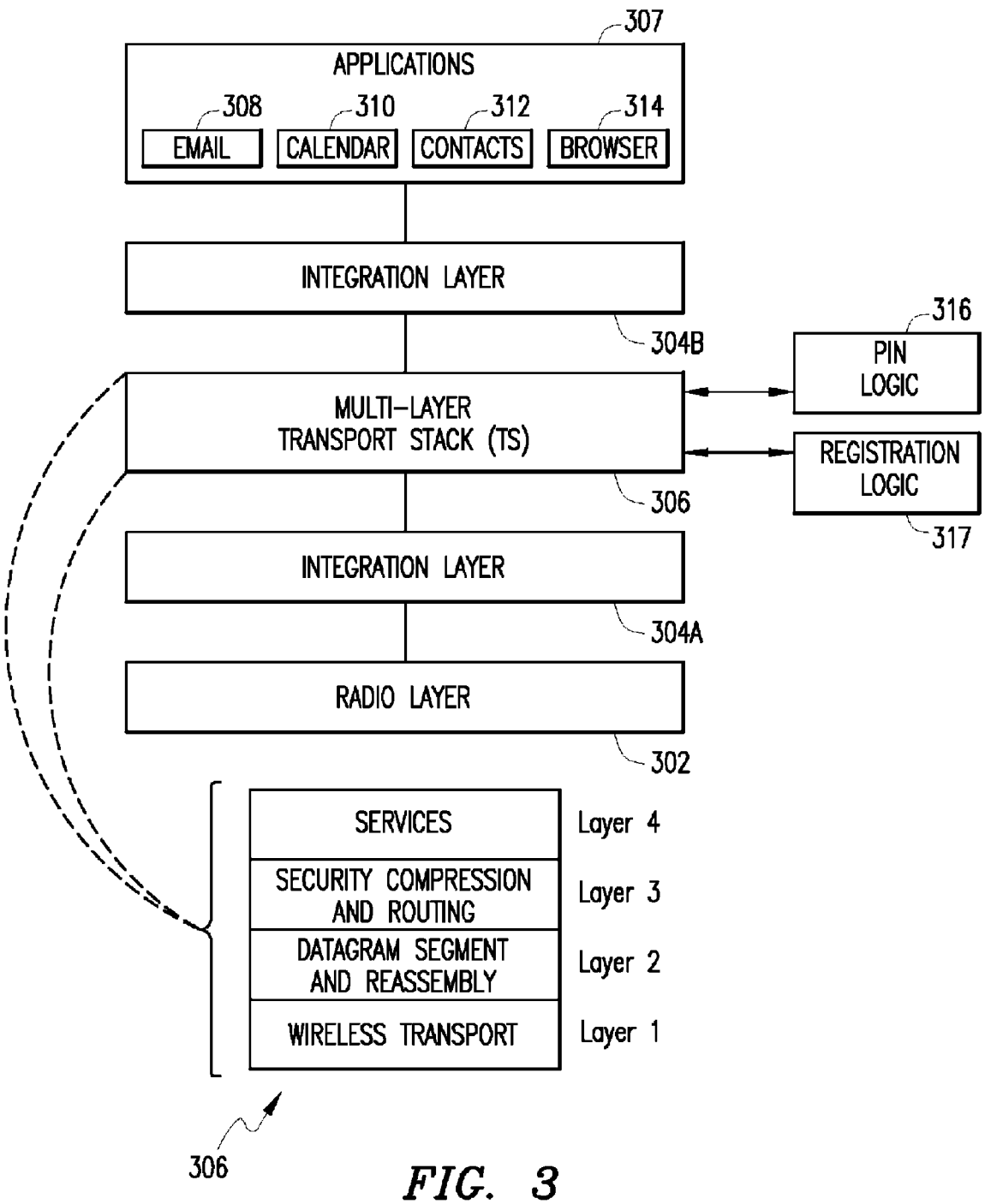
FIG. 3 depicts a software architectural view of a mobile communications device according to one embodiment.

FIG. 3 depicts a software architectural view of a mobile communications device operable according to one embodiment for requesting a personalized indicium (such as a PIN) in a dynamic manner. A multi-layer transport stack (TS) 306 is operable to provide a generic data transport protocol for any type of corporate data, including email, via a reliable, secure and seamless continuous connection to a wireless packet data service network. As illustrated in the embodiment of FIG. 3, an integration layer 304A is operable as an interface between the MCD's radio layer 302 and the transport stack 306. Likewise, another integration layer 304B is provided for interfacing between the transport stack 306 and the user applications 307 supported on the MCD, e.g., email 308, calendar/scheduler 310, contact management 312 and browser 314. Although not specifically shown, the transport stack 306 may also be interfaced with the MCD's operating system. In another implementation, the transport stack 306 may be provided as part of a data communications client module operable as a host-independent virtual machine on a mobile device.

The bottom layer (Layer 1) of the transport stack 306 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. L The remaining two layers, Layer 2 and Layer 3, are responsible for datagram segmentation/reassembly and security, compression and routing, respectively.

A PIN logic module 316 provided as part of the MCD's software environment is disposed in operable communication with the transport stack 306 as well as the OS environment. In one embodiment, the PIN logic module 316 comprises logic operable to generate a temporary PIN for transmission in a "PIN request" message to a network node, e.g., a relay node and associated registration server, since PIN may be a required parameter in communications between an MCD and the serving relay node. Further, as will be shown below, appropriate network logic (provided as part of the relay node's registration servers, provisioning system, etc.) is operable to assign a more persistent PIN to the requesting MCD based on the parametric information of the PIN request message. In one exemplary implementation, the PIN logic means 316 includes logic for randomly generating a temporary PIN (TPIN) that is in conformity with service provisioning requirements regardless of the manufacturer of the MCD or the wireless service provider. For example, the PIN logic means 316 may comprise logic for randomly generating a TPIN within a select range of numbers such as the [0xF1xxxxxx] range. Alternatively, the PIN logic may comprise logic for generating the TPIN based on such techniques as hashing of at least one hardware device identifier or subscriber identifier associated with the MCD in order to reduce the probability of two MCDs having the same TPIN. As one of ordinary skill in the art should appreciate, such identifiers comprise International Mobile station Equipment Identity (IMEI) parameters, International Mobile Subscriber Identity (IMSI) parameters, Electronic Serial Number (ESN) parameters, Mobile Identification Number (MIN) parameters, et cetera, that are hard-coded into MCDs depending on the wireless network technologies and protocols. Additionally, IP addresses corresponding to the MCDs may also operate as device identifiers for purposes of the present patent application.

Continuing to refer to FIG. 3, a registration logic module 317 provided as part of the MCD's software environment is disposed in operable communication with the transport stack 306 as well as the OS environment for effectuating registration procedures, as and when needed, with the serving relay network. In one implementation, where a PIN is not provided otherwise, the registration logic module 317 includes logic means operable to execute a registration procedure with the serving relay node using a PIN indicium returned from the relay in response to the MCD's PIN request.

Figure 4:
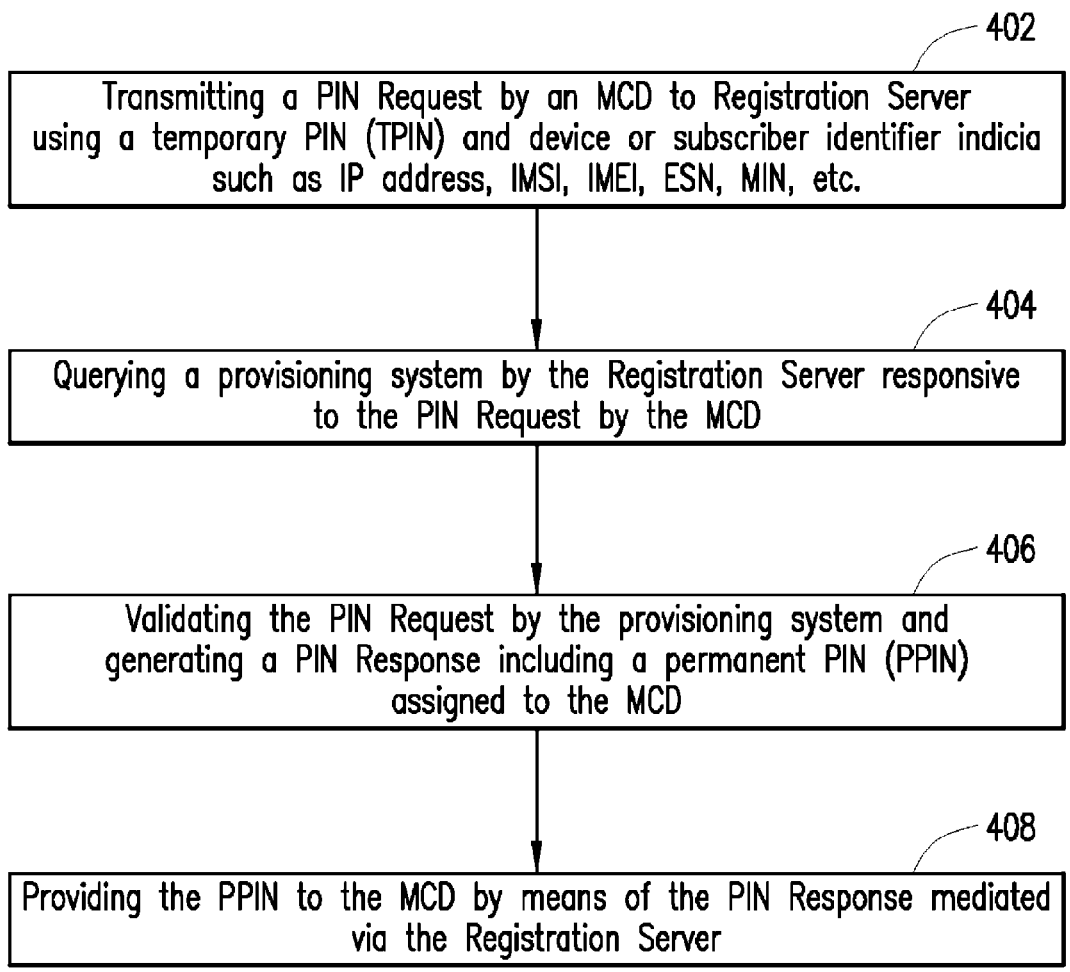
FIG. 4 depicts a flowchart of an embodiment for dynamically assigning a Personal Information Number (PIN) indicium to a mobile communications device.

FIG. 4 depicts a flowchart of an embodiment for dynamically assigning a personalized indicium such as PIN indicium to an MCD. When the MCD is manufactured, it may not be assigned any PIN indicium (i.e., a "blank" MCD) suitable for engaging in data sessions mediated via a relay network, although it is typically coded with one or more device identifiers. Additionally, once the MCD is deployed, it may be provided with an IP address since it is an IP appliance operable with a wireless packet data service network. Upon activation, a PIN request may be transmitted r by the MCD to a network node with registration services for assignment of a PIN (block 402). In one implementation, such a request may be effectuated prior to any registration procedure required of the MCD. As explained hereinabove, appropriate PIN logic provided with the MCD is operable to generate a TPIN, preferably based on the MCD's device/subscriber identifier (s) in order to reduce collisions, which is transmitted as a parameter in the PIN request message. One or more device/subscriber identifiers such as IP address, IMEI, IMSI, ESN, MIN, et cetera, are also transmitted via the PIN request. Responsive thereto, the registration server queries a provisioning system in order to validate the PIN request, including the parametric information therein (block 404). Upon validating the request, a PIN response message is provided by the relay network node that includes a "permanent" PIN (which may be generated dynamically or selected from a pool of provisioned PINs) assigned to the MCD (blocks 406, 408), In one implementation, the PIN response message may include a pending time window (i.e., a "lifetime" parameter) associated with the "permanent" PIN such that if the MCD fails to execute a successful registration procedure using the assigned PIN within the pending time window, the assigned PIN may be disassociated by the provisioning logic. On the other hand, if a successful registration procedure is executed within the time window, the provisioning logic may persistently bind the assigned PIN to one or more device and/or subscriber identifiers of the MCD in its device/subscriber tables. It should therefore be appreciated that such flexibility in dynamically assigning PINs imparts additional PIN management capability to the provisioning logic of a network not only with respect to avoiding PIN collisions but also where security and reliability issues are involved, e.g., a permanent PIN is lost or an unauthorized MCD attempts to gain access to the network using a stolen PIN.

Figure 5:
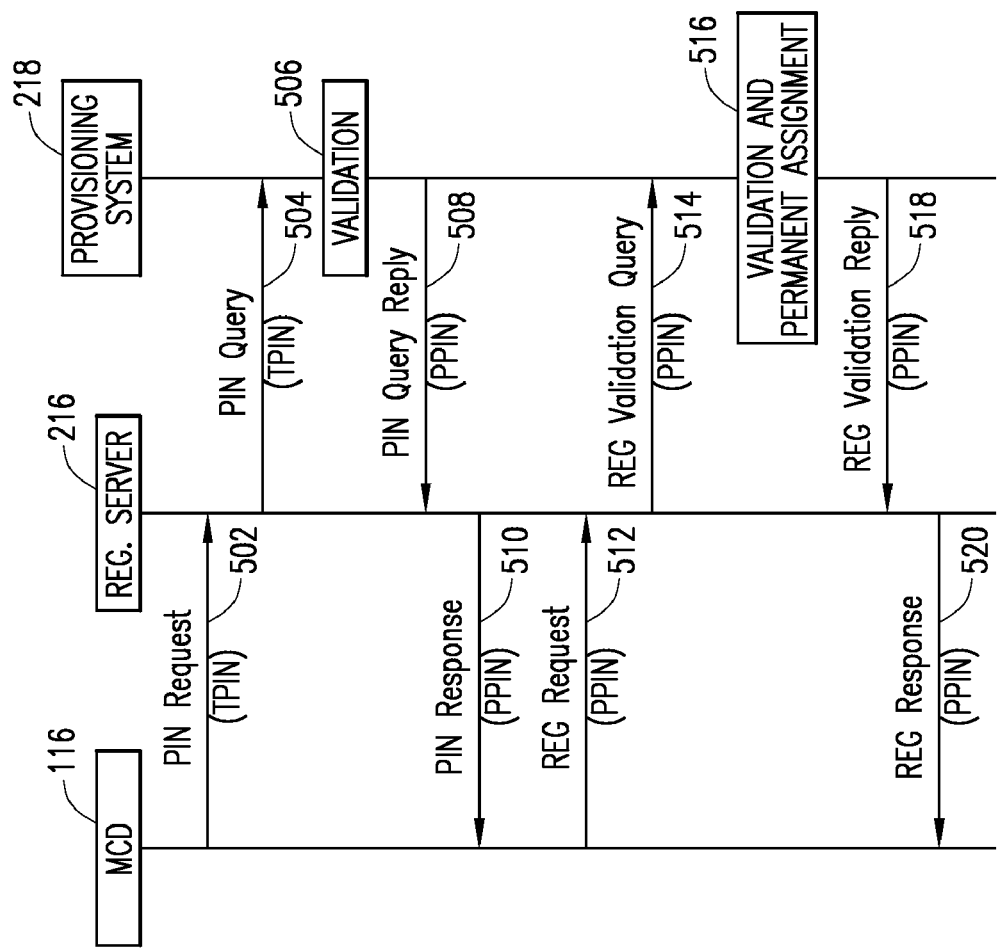
FIG. 5 depicts a message flow diagram with respect to an exemplary dynamic PIN assignment mechanism according to one embodiment.

FIG. 5 depicts a message flow diagram with respect to an exemplary dynamic PIN assignment mechanism according to one embodiment. A PIN request message 502 is transmitted by MCD 116 to a network node, e.g., registration server 216, wherein the request message 502 includes TPIN as well as device/subscriber identifier indicia as parametric information. Registration server 216 queries suitable service logic, which may be embodied as the provisioning system 218 associated with the relay services network described above, by issuing a PIN query 504 thereto, which includes the parametric information received in the PIN request 502. The provisioning system's validation logic 506 is operable to authenticate the request (if encrypted), validate the identifier information, and ensure that the TPIN is within a select range, etc. Upon successful validation, a "permanent" PIN (PPIN) is provided via a query reply 508 to the registration server 216, from where it is transmitted to MCD 116 via a PIN response message 510. As alluded to previously, additional parametric information (e.g., PIN lifetime) may be provided as part of the response message 510. A registration request 512 using PPIN may then be executed by MCD 116. In response, the registration server 216 is operable to interrogate the provisioning system via a registration validation query 514 for PIN validation and permanent assignment 516. Upon successful validation, the PPIN is persistently bound to one or more identifiers of the MCD, e.g., its IMEI (if GPRS or IDEN) or ESN (if CDMA). Otherwise, the assigned PIN is disassociated from the MCD's identifiers and returned to the PIN pool for recycling. A validation reply message 518 is thereafter provided to the registration server 216, which then transmits an appropriate registration response message 520 to MCD 116.

In one embodiment, the interface between the provisioning system and the relay node modules for effectuating dynamic PIN request messaging may be implemented as a HyperText Transfer Protocol (HTTP) interface, using any Markup Language. However, it should be apparent that other messaging interfaces may also be provided for such purposes in accordance with the teachings of the present patent application. The following tables set forth exemplary payload formats of dynamic PIN request and response messages according to one implementation:

TABLE I (Dynamic PIN Request)

| Parameter Name | Content Format | Examples | Notes |
|---|---|---|---|
| IMEI | String | 001004100300790 | Mandatory when the device is GPRS or IDEN |
| ESN | String (ddd/ddddddd) | 076/00319130 | Mandatory when the device is CDMA |
| IMSI | String | 302720200027430 | Optional |
| MSISDN | String | 9054445555 | Optional |
| ICCID | String | 89302720302000551500 | Optional |
| MDN | String | 9056294746 | Optional (CDMA) |
| SIMID | String | 000800525601300 | Optional (IDEN) |

TABLE II (Dynamic PIN Response)

| Parameter Name | Content Format | Examples | Notes |
|---|---|---|---|
| DynamicPin | PIN native format | 20AA0055 | When the request is successful |
| ErrorCode | Decimal String | 3 Possible Values: -100 - Missing ESN or IMEI in request -100 - ESN or IMEI of MCD without suitable software -200 - PRV system error | When PRV failed to fulfill the request |
| Lifetime | Decimal String | Minutes | Pending lifetime of PIN |
| ErrorDescr | String | A detailed description of the error such as "ESN or IMEI not recognized as provisioned MCD" | When PRV failed to fulfill the request |

Figure 6A:
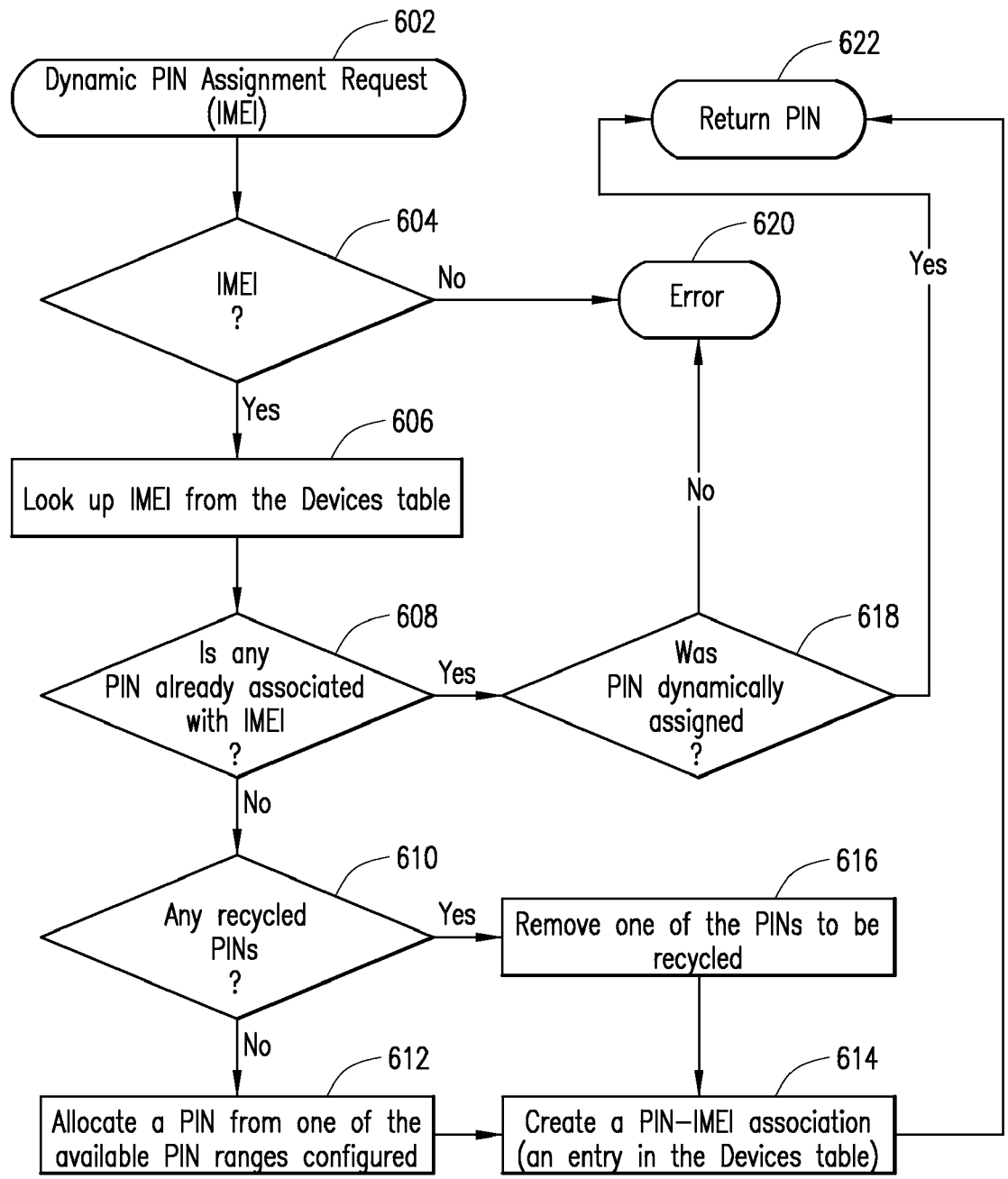
FIG. 6A depicts a flowchart of an embodiment of a PIN management mechanism according to one embodiment.

FIG. 6A depicts a flowchart of an embodiment of a PIN pool management mechanism according to one embodiment wherein PIN indicia are dynamically assigned. Upon receiving a dynamic PIN assignment request by an MCD (block 602), the network service logic makes a determination whether a device identifier (e.g., IMEI) is provided (block 604). If so, a device table is queried (block 606) to determine if any PIN is already associated with the IMEI parameter (block 608). If affirmative, a further determination is made as to whether the PIN was dynamically assigned (block 618). If the PIN was not dynamically assigned or if there was no IMEI, the flow control returns an error (block 620). On the other hand, if the PIN was already associated with IMEI and the PIN was dynamically assigned, the validation is complete and the PIN is returned (block 622).

If the device's IMEI is not associated with any PIN (as determined by block 608), the service logic determines whether there are any recycled PINs (block 610). If so, one of the PINs from the recycled PIN pool is removed (block 616) for creating a PIN-IMEI association (e.g., an entry in the devices table) (block 614), whereupon the PIN is returned (block 622). If no recycled PIN is available, a new PIN is allocated from one of the PIN ranges configured (block 612). Thereafter, a PIN-IMEI association is created and the PIN is returned (blocks 614, 422).

Figure 6B:
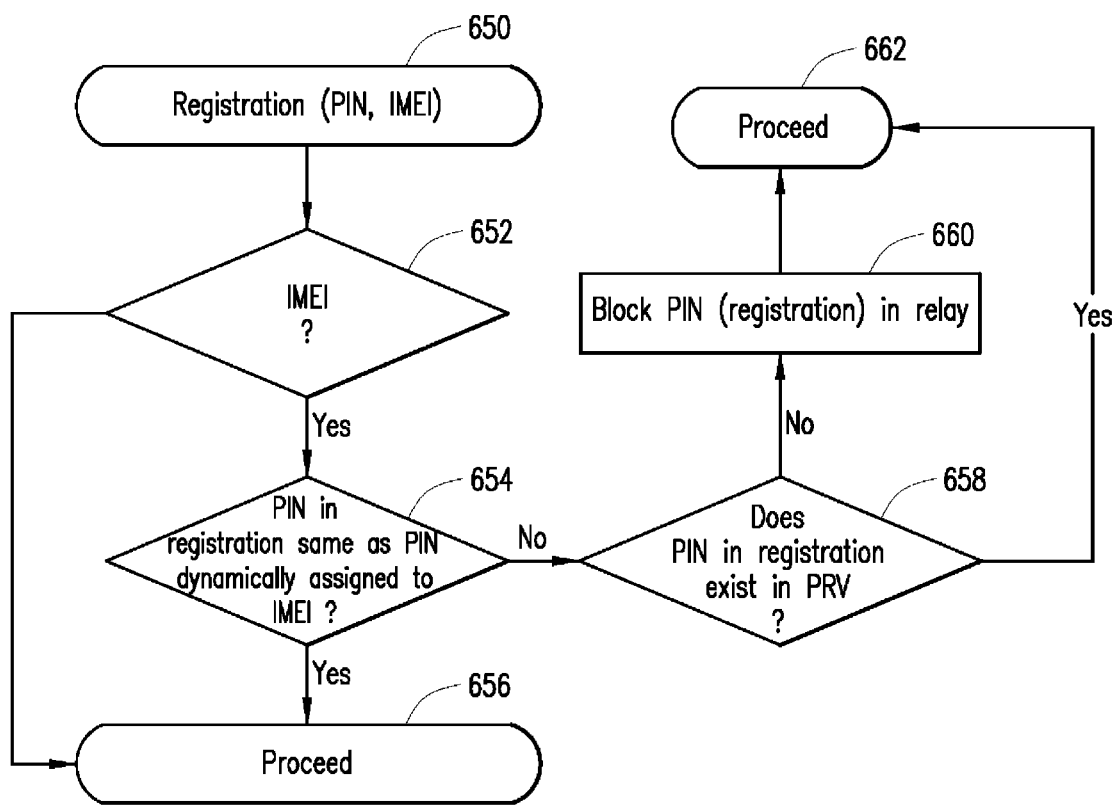
FIG. 6B depicts a flowchart of an embodiment for registering a mobile communications device using a dynamically assigned PIN.

FIG. 6B depicts a flowchart of an embodiment for registering an MCD using a dynamically assigned PIN. Upon issuing a registration request by the MCD (block 650), which includes PIN and device identifier information such as, e.g., IMEI, the network service logic determines if IMEI is associated with a provisioned MCD (block 652). If so, a further determination is made whether the PIN in the registration request is the same as the PIN dynamically assigned to the IMEI parameter (block 654). If affirmative, the flow control proceeds with the registration process in normal manner (block 656). If the PIN in the registration request is different from the PIN dynamically assigned to the IMEI parameter, yet another determination is made whether the PIN in the registration request exists in the provisioning database (block 658). If not, the registration as well as the PIN is blocked in the serving relay node (block 660). Otherwise, the registration process continues (block 662), signifying that the MCD was assigned a valid PIN via some other mechanism (e.g., a "non-blank" MCD).

Figure 7:
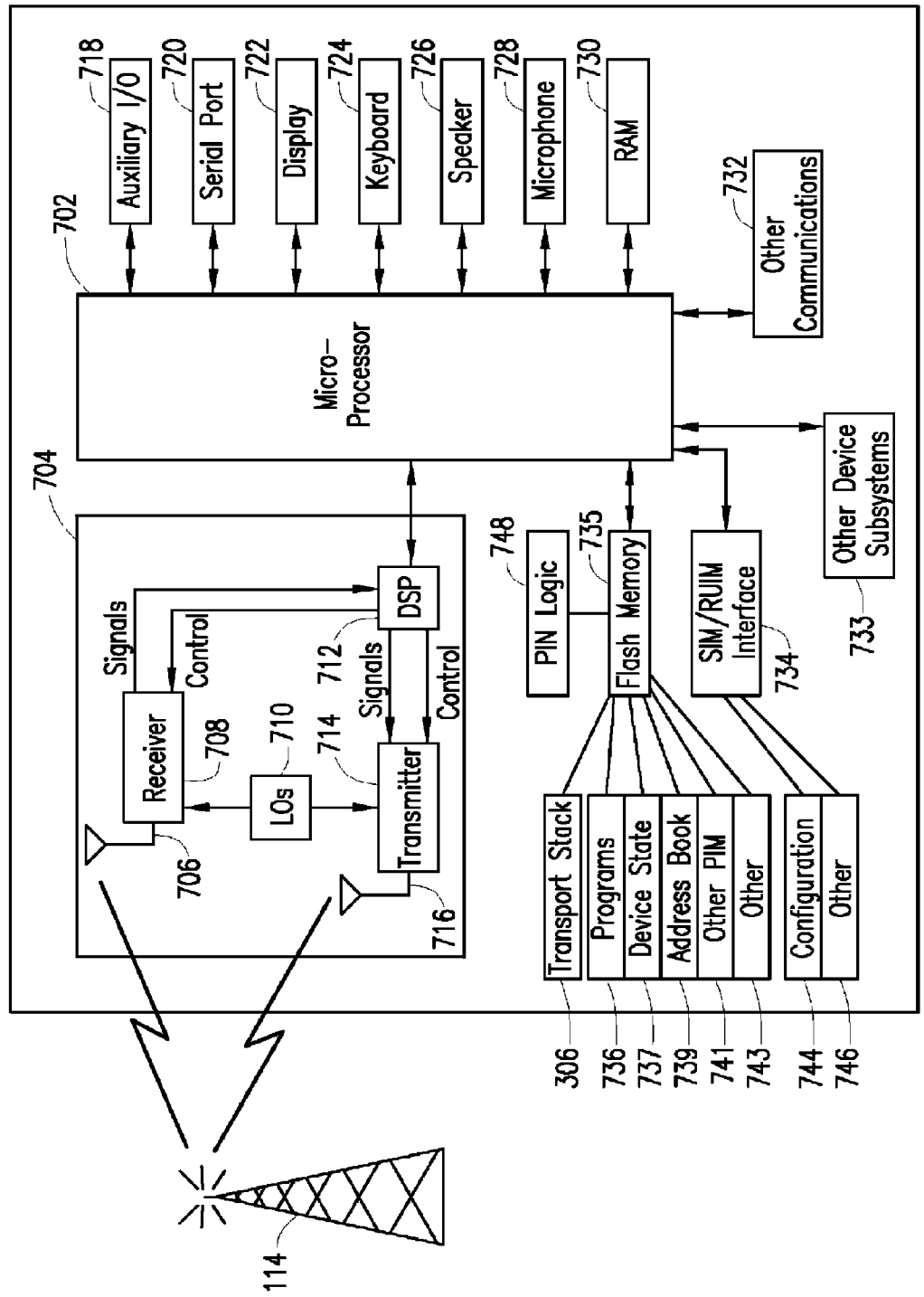
FIG. 7 depicts a block diagram of a mobile communications device according to one embodiment.

FIG. 7 depicts a block diagram of a mobile communications device operable according to one embodiment. It will be recognized by those skilled in the art upon reference hereto that although an embodiment of MCD 116 may comprise an arrangement similar to one shown in FIG. 7, there can be a number of variations and modifications, in hardware, software or firmware, with respect to the various modules depicted. Accordingly, the arrangement of FIG. 7 should be taken as illustrative rather than limiting with respect to the embodiments of the present patent application. A microprocessor 702 providing for the overall control of an embodiment of MCD 116 is operably coupled to a communication subsystem 704 which includes a receiver 708 and transmitter 714 as well as associated components such as one or more local oscillator (LO) modules 710 and a processing module such as a digital signal processor (DSP) 712. As will be apparent to those skilled in the field of communications, the particular design of the communication module 704 may be dependent upon the communications network with which the mobile device is intended to operate. In one embodiment, the communication module 704 is operable with both voice and data communications. Regardless of the particular design, however, signals received by antenna 706 through BS 114 are provided to receiver 708, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 712, and provided to transmitter 714 for digital-to-analog (D/A) conversion, frequency up conversion, filtering, amplification and transmission over the air-radio interface via antenna 716.

Microprocessor 702 also interfaces with further device subsystems such as auxiliary input/output (I/O) 718, serial port 720, display 722, keyboard 724, speaker 726, microphone 728, random access memory (RAM) 730, a short-range communications subsystem 732, and any other device subsystems generally labeled as reference numeral 733. To control access, a Subscriber Identity Module (SIM) or Removable user Identity Module (RUIM) interface 734 is also provided in communication with the microprocessor 702. In one implementation, SIM/RUIM interface 734 is operable with a SIM/RUIM card having a number of key configurations 744 and other information 746 such as identification and subscriber-related data.

Operating system software and transport stack software may be embodied in a persistent storage module (i.e., non-volatile storage) such as Flash memory 735. In one implementation, Flash memory 735 may be segregated into different areas, e.g., storage area for computer programs 736 as well as data storage regions such as device state 737, address book 739, other personal information manager (PIM) data 741, and other data storage areas generally labeled as reference numeral 743. Additionally, a PIN logic module 748 is provided for generating a temporary PIN according to the teachings set forth hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A method operable on a mobile communications device for assigning a personalized indicium to the mobile communications device, comprising:

transmitting a request by said mobile communications device to a network node, said request including a temporary Personal Information Number (PIN) and at least one of a device identifier and a subscriber identifier relating to said mobile communications device, wherein said temporary PIN is locally generated within said mobile communications device; and receiving a response from said network node, said response including a permanent PIN assigned to said mobile communications device and a pending time window associated with said permanent PIN such that if said mobile communications device executes a successful registration procedure within said pending time window, said permanent PIN is persistently bound to said at least one of a device identifier and a subscriber identifier relating to said mobile communications device.

2. The method for assigning a personalized indicium to a mobile communications device as recited in claim 1, wherein said network node is operable with a wireless packet data service network comprising one of a General Packet Radio Service (GPRS) network, an Enhanced Data Rates for Global System for Mobile Communications (GSM) Evolution (EDGE) network, a $3^{rd}$ Generation (3G) network, an Integrated Digital Enhanced Network (IDEN), a Code Division Multiple Access (CDMA) network and a Universal Mobile Telecommunications System (UMTS) network.

3. The method for assigning a personalized indicium to a mobile communications device as recited in claim 1, wherein said at least one of a device identifier comprises an International Mobile station Equipment Identity (IMEI) parameter corresponding to said mobile communications device.

4. The method for assigning a personalized indicium to a mobile communications device as recited in claim 1, wherein said at least one of a subscriber identifier comprises an International Mobile Subscriber Identity (IMSI) parameter corresponding to a user of said mobile communications device.

5. The method for assigning a personalized indicium to a mobile communications device as recited in claim 1, wherein said at least one of a device identifier comprises an Electronic Serial Number (ESN) parameter corresponding to said mobile communications device.

6. The method for assigning a personalized indicium to a mobile communications device as recited in claim 1, wherein said at least one of a device identifier comprises a Mobile Identification Number (MIN) parameter corresponding to said mobile communications device.

7. The method for assigning a personalized indicium to a mobile communications device as recited in claim 1, wherein said at least one of a device identifier comprises an Internet Protocol (IP) address corresponding to said mobile communications device.

8. The method for assigning a personalized indicium to a mobile communications device as recited in claim 1, wherein said temporary PIN is generated randomly by a logic module integrated with said mobile communications device.

9. The method for assigning a personalized indicium to a mobile communications device as recited in claim 1, wherein said temporary PIN is generated based on hashing said at least one of a device identifier and a subscriber identifier by a logic module integrated with said mobile communications device.

10. The method for assigning a personalized indicium to a mobile communications device as recited in claim 1, wherein said temporary PIN is generated randomly within a select range of numbers by a logic module integrated with said mobile communications device.

11. The method for assigning a personalized indicium to a mobile communications device as recited in claim 1, wherein said request is validated by a provisioning system coupled to said network node.

12. The method for assigning a personalized indicium to a mobile communications device as recited in claim 1, wherein if said mobile communications device fails to execute a successful registration procedure within said pending time window associated with said permanent PIN, said permanent PIN is disassociated from said mobile communications device.

13. A network node for dynamically assigning Personal Information Numbers (PINs) to mobile communications devices, comprising:
means for validating a request received from a mobile communications device, said request including a temporary PIN locally generated within said mobile communications device and at least one of a device identifier and a subscriber identifier relating to said mobile communications device;
means for assigning a permanent PIN to said mobile communications device upon validating said request, wherein said permanent PIN is operable to be transmitted to said mobile communications device via a response from said network node; and
means for persistently binding said permanent PIN to said at least one of a device identifier and said a subscriber identifier associated with said mobile communications device if said mobile communications device registers with said network node using said permanent PIN within a time window provided in said response.

14. The network node for dynamically assigning PINs to mobile communications devices as recited in claim 13, wherein said at least one of a device identifier comprises an International Mobile station Equipment Identity (IMEI) parameter corresponding to said mobile communications device.

15. The network node for dynamically assigning PINs to mobile communications devices as recited in claim 13, wherein said at least one of a subscriber identifier comprises an International Mobile Subscriber Identity (IMSI) parameter corresponding to a user of said mobile communications device.

16. The network node for dynamically assigning PINs to mobile communications devices as recited in claim 13, wherein said at least one of a device identifier comprises an Electronic Serial Number (ESN) parameter corresponding to said mobile communications device.

17. The network node for dynamically assigning PINs to mobile communications devices as recited in claim 13, wherein said at least one of a device identifier comprises a Mobile Identification Number (MIN) parameter corresponding to said mobile communications device.

18. The network node for dynamically assigning PINs to mobile communications devices as recited in claim 13, wherein said at least one of a device identifier comprises an Internet Protocol (IP) address corresponding to said mobile communications device.

19. The network node for dynamically assigning PINs to mobile communications devices as recited in claim 13, further including means for disassociating said permanent PIN from said mobile communications device if said mobile communications device fails to register with said network node using said permanent PIN within a time window provided in said response.

20. A method for dynamically assigning Personal Information Numbers (PINs) to mobile communications devices, comprising:
validating a request received from a mobile communications device, said request including a temporary Personal Information Number (TPIN) generated within said mobile communications device and at least one of a device identifier and a subscriber identifier relating to said mobile communications device;
provisioning a permanent PIN (PPIN) to said mobile communications device upon validating said request;
providing said PPIN to said mobile communications device via a response that includes a time window parameter;
determining that a registration request using said PPIN was received from said mobile communications device within a time period defined by said time window parameter; and
responsive to said determining, persistently binding said PPIN to said at least one of a device identifier and a subscriber identifier relating to said mobile communications device.

21. The method for dynamically assigning PINs to mobile communications devices as recited in claim 20, wherein said PPIN is persistently bound to one of an International Mobile station Equipment Identity (IMEI) parameter, an International Mobile Subscriber Identity (IMSI) parameter, an Electronic Serial Number (ESN) parameter, a Mobile Identification Number (MIN) parameter, and an Internet Protocol (IP) address corresponding to said mobile communications device.

22. The method for dynamically assigning PINs to mobile communications devices as recited in claim 20, wherein said PPIN is provisioned from a pool of numbers.

23. The method for dynamically assigning PINs to mobile communications devices as recited in claim 20, wherein said PPIN is dynamically generated.

24. A method for dynamically assigning PINs to mobile communications devices comprising:
- validating a request received from a mobile communications device, said request including a temporary Personal Information Number (TPIN) generated within said mobile communications device and at least one of a device identifier and a subscriber identifier relating to said mobile communications device;
- provisioning a permanent PIN (PPIN) to said mobile communications device upon validating said request;
- providing said PPIN to said mobile communications device via a response that includes a time window parameter;
- determining that a registration request using said PPIN was not received from said mobile communications device within a time period defined by said time window parameter; and
- responsive to said determining, disassociating said PPIN from said mobile communications device.

25. A network node adapted for dynamically assigning Personal Information Numbers (PINs) to mobile communications devices, comprising:
- means for validating a request received from a mobile communications device, said request including a temporary Personal Information Number (TPIN) generated within said mobile communications device and at least one of a device identifier and a subscriber identifier relating to said mobile communications device;
- means for provisioning a permanent PIN (PPIN) to said mobile communications device upon validating said request;
- means for providing said PPIN to said mobile communications device via a response that includes a time window parameter;
- means for determining that a registration request using said PPIN was received from said mobile communications device within a time period defined by said time window parameter; and
- means, operable responsive to said determining, for persistently binding said PPIN to said at least one of a device identifier and a subscriber identifier relating to said mobile communications device.

26. The network node adapted for dynamically assigning PINs to mobile communications devices as recited in claim 25, wherein said PPIN is persistently bound to one of an International Mobile station Equipment Identity (IMEI) parameter, an International Mobile Subscriber Identity (IMSI) parameter, an Electronic Serial Number (ESN) parameter, a Mobile Identification Number (MIN) parameter, and an Internet Protocol (IP) address corresponding to said mobile communications device.

27. The network node adapted for dynamically assigning PINs to mobile communications devices as recited in claim 25, further comprising:
- means for determining that a registration request using said PPIN was not received from said mobile communications device within a time period defined by said time window parameter; and
- means, operable responsive to said determining, for disassociating said PPIN from said mobile communications device.

28. The network node adapted for dynamically assigning PINs to mobile communications devices as recited in claim 25, wherein said permanent PIN is one of a number dynamically generated and a number selected from a pool of numbers.

* * * * *

UNITED STATES PATENT AND TRADEMARK OFFICE
CERTIFICATE OF CORRECTION

| | | |
|---|---|---|
| PATENT NO. | : 8,090,348 B2 | |
| APPLICATION NO. | : 12/029870 | |
| DATED | : January 3, 2012 | |
| INVENTOR(S) | : Graeme Whittington et al. | |

It is certified that error appears in the above-identified patent and that said Letters Patent is hereby corrected as shown below:

Column 3,
Line 46, "can t include" should read --can include--.

Column 7,
Line 4, "transmitted r by" should read --transmitted by--.

Column 7,
Line 21, "406, 408), In" should read --406, 408). In--.

Signed and Sealed this
Tenth Day of April, 2012

David J. Kappos
*Director of the United States Patent and Trademark Office*